UNITED STATES PATENT OFFICE.

HERMANN WAGNER, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

MONOAZO DYESTUFFS AND PROCESS OF MAKING SAME.

1,082,719. Specification of Letters Patent. Patented Dec. 30, 1913.

No Drawing. Application filed June 14, 1910. Serial No. 566,817.

*To all whom it may concern:*

Be it known that I, HERMANN WAGNER, Ph. D., chemist, a citizen of the Empire of Germany, residing at Höchst-on-the-Main, Germany, have invented certain new and useful Improvements in New Monoazo Dyestuffs and Processes of Making Same, of which the following is a specification.

I have found that valuable yellow monoazo-pigment dyestuffs can be obtained by combining a diazotized mono- or dinitramin of the benzene- or naphthalene series, or a substitution product thereof, with acetoacetic anilid. The combination may occur in presence or absence of a substratum, but it is preferable to use a substratum, as this effects a better distribution of the dyestuff. In this process the following nitramins may, for instance, be used: The ortho- and the para-nitranilin, the chloronitranilins, the dinitranilins, the dichloronitranilins, the nitrotoluidins, the chloronitrotoluidins, the nitroanisidins, the chloronitroanisidins, the nitrophenetidins, the nitroxylidins, the nitrocumidins and the nitronaphthylamins.

The new dyestuffs are distinguished by a remarkably pure yellow tint and at the same time by excellent fastness to light and good insolubility in oil, alcohol and water. They have the general formula:—

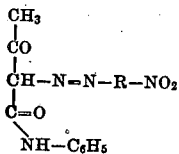

wherein "R" means an aryl residue. When mixed with a substratum, they constitute a valuable color-lake which, owing to the excellent fastness of the dyestuff, is particularly suitable for oil- and lime colorings, and also for printing purposes.

Example I: A diazo solution, produced in the usual manner from 13.8 kg. of para-nitranilin, is combined in the cold with an aqueous solution of 17.8 kg. of acetoacetic anilid dissolved with aid of 13 kg. of caustic soda lye of 40° Bé. In order to facilitate the reaction it is advantageous to add to the mixture the quantity of sodium acetate necessary for suppressing the reaction of the mineral acid. The dyestuff thus formed has a bright yellow color and melts at about 210° C.; in concentrated sulfuric acid it dissolves to a dark yellow solution.

Example II: A diazo solution, produced in the usual manner from 15.2 kg. of meta-nitro-para-toluidin, is combined in the cold with an aqueous solution of 17.8 kg. of acetoacetic anilid dissolved with aid of 13 kg. of caustic soda lye of 40° Bé. In order to facilitate the reaction it is advantageous to add to the mixture the quantity of sodium acetate necessary for suppressing the reaction of the mineral acid. The dyestuff thus formed has a bright yellow color and melts at about 250° C.; in concentrated sulfuric acid it dissolves to a yellow solution.

The monoazo dyestuff produced from m-nitro-para-toluidin has the formula:

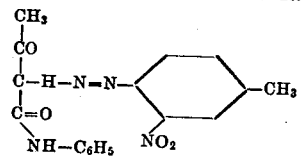

The analogous combination of ortho-nitranilin has a pure lemon color and melts at about 200° C.

Having now described my invention what I claim is:

1. The herein-described process of manufacturing yellow monoazo dyestuffs, insoluble in water, which consists in combining with acetoacetic anilid the diazo compound of a nitroarylamin.

2. The herein-described process of manufacturing yellow monoazo dyestuffs, insoluble in water, which consists in combining with acetoacetic anilid the diazo compound of a nitroarylamin, the combination occurring in presence of a substratum.

3. As new products, monoazo dyestuffs of the formula:

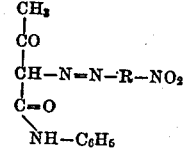

wherein "R" means an aryl residue being pure yellow bodies, insoluble in water, oil and alcohol, and possessing great fastness to light.

4. As a new product, the monoazo dyestuff of the formula:

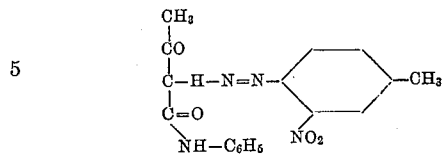

being a pure yellow body, insoluble in water, oil and alcohol, and possessing great fastness to light.

5. As new products, yellow dyestuffs of the formula:

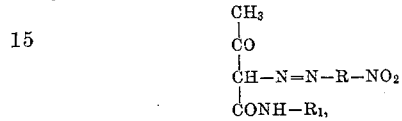

wherein "R" means a substituted aryl residue and "$R_1$" a substituent, said dyestuffs being insoluble in water, possessing great fastness to light, and furnishing valuable color-lakes.

6. As new products, yellow dyestuffs of the formula:

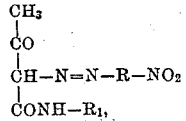

wherein "R" and "$R_1$" mean aryl residues, said dyestuffs being insoluble in water, possessing great fastness to light, and furnishing valuable color-lakes.

In testimony whereof, I affix my signature in presence of two witnesses.

HERMANN WAGNER.

Witnesses:
 JEAN GRUND,
 CARL GRUND.